(No Model.)  5 Sheets—Sheet 1.

S. F. STEVENS.
RAILROAD FARE BOOK.

No. 448,688.  Patented Mar. 24, 1891.

| Index to C A | F. Avenue Bushwick To | F. Avenue | Bedford | E. New York | Cypress Av | U. Course | Woodhaven | Morris Park | Bushwick | Morris Pk. | Woodhaven | U. Course | Cypress Ave | E. New York | Bedford | F. Avenue | F. Avenue Bushwick To | |
|---|---|---|---|---|---|---|---|---|---|---|---|---|---|---|---|---|---|---|
| | | A | A | A | A | A | A | A | A | B | B | B | B | B | B | B | B | |
| d² 5 | F. Avenue | | .15 | .20 | .25 | .25 | .30 | .35 | .40 | 2.15 | 2.20 | 2.25 | 2.30 | 2.35 | 2.40 | 2.45 | 2.50 | Franklinville | |
| | Bedford | .15 | | .20 | .25 | .25 | .30 | .35 | .40 | 2.20 | 2.25 | 2.30 | 2.35 | 2.40 | 2.45 | 2.50 | 2.60 | Mattituck | d² |
| | E. New York | .20 | .20 | | .20 | .20 | .20 | .25 | .35 | 2.25 | 2.30 | 2.35 | 2.40 | 2.45 | 2.50 | 2.55 | 2.65 | Cutchogue | |
| g² 1 | Cypress Ave | .25 | .25 | .20 | | .15 | .20 | .20 | .20 | 2.30 | 2.35 | 2.40 | 2.45 | 2.50 | 2.55 | 2.60 | 2.75 | Peconic | g² |
| | U. Course | .25 | .25 | .20 | .15 | | .15 | .20 | .20 | 2.35 | 2.40 | 2.45 | 2.50 | 2.55 | 2.60 | 2.65 | 2.80 | Southold | |
| d² 6 | Woodhaven | .30 | .30 | .20 | .20 | .15 | | .15 | .20 | 2.40 | 2.45 | 2.50 | 2.55 | 2.60 | 2.65 | 2.70 | 2.95 | Greenvale | d² |
| | Morris Park | .35 | .35 | .25 | .20 | .20 | .15 | | .20 | 2.45 | 2.50 | 2.55 | 2.60 | 2.65 | 2.70 | 2.75 | 3.00 | Locust Ave | |
| | Bushwick | .50 | .45 | .42 | .40 | .25 | .20 | .20 | | 2.50 | 2.55 | 2.60 | 2.65 | 2.70 | 2.75 | 2.80 | 3.10 | Springfield | |
| | E. Williston | .65 | .65 | .60 | .55 | .50 | .50 | .50 | .60 | 2.55 | 2.60 | 2.65 | 2.70 | 2.75 | 2.80 | 2.85 | 3.15 | Speonk | |
| d² | Albertsons | .65 | .65 | .65 | .60 | .55 | .55 | .55 | .65 | 2.60 | 2.65 | 2.70 | 2.75 | 2.80 | 2.85 | 2.90 | 3.20 | W. Hampton | d² |
| | Roslyn | .65 | .65 | .65 | .60 | .60 | .60 | .60 | .65 | 2.75 | 2.80 | 2.75 | 2.90 | 2.85 | 2.90 | 2.95 | 3.25 | Quogue | |
| g² 2 | Greenvale | .65 | .65 | .65 | .65 | .65 | .65 | .65 | .65 | 2.80 | 2.80 | 2.80 | 2.95 | 2.90 | 2.95 | 3.00 | 3.30 | Good Ground | g² |
| | Glen Head | .65 | .65 | .65 | .65 | .65 | .65 | .65 | .65 | 2.80 | 2.82 | 2.85 | 3.00 | 2.95 | 3.00 | 3.05 | 3.35 | S. Hampton | |
| d² | Sea Cliff | .65 | .65 | .65 | .65 | .65 | .65 | .65 | .65 | 2.82 | 2.85 | 2.90 | 3.05 | 3.00 | 3.05 | 3.10 | 3.40 | W. Mills | d² |
| | Glen Cove | .65 | .65 | .65 | .65 | .65 | .65 | .65 | .65 | 2.85 | 2.90 | 3.00 | 3.10 | 3.05 | 3.10 | 3.15 | 3.45 | B. Hampton | |
| | Locust Vall. | .70 | .70 | .70 | .70 | .70 | .70 | .70 | .70 | 2.90 | 3.00 | 3.05 | 3.15 | 3.10 | 3.15 | 3.20 | 3.50 | Sag Harbor | |

Fig. 1.

WITNESSES.
Walter W. Lovegrove.
Charles S. Buntnall.

INVENTOR.
Samuel F. Stevens
by W. E. Hagan
ATTORNEY.

(No Model.)

5 Sheets—Sheet 2.

S. F. STEVENS.
RAILROAD FARE BOOK.

No. 448,688.

Patented Mar. 24, 1891.

| Index to C A | E. Williston Locust Valley To | E. Williston | Albertsons | Roslyn | Greenvale | Glen Head | Sea Cliff | Glen Cove | Locust Vall'y | Locust Vall'y | Glen Cove | Sea Cliff | Glen Head | Greenvale | Roslyn | Albertsons | E. Williston | E. Williston Locust Valley To | |
|---|---|---|---|---|---|---|---|---|---|---|---|---|---|---|---|---|---|---|---|
| | A | A | A | A | A | A | A | A | A | B | B | B | B | B | B | B | B | B | |
| 5 | F. Avenue | .65 | .65 | .65 | .65 | .65 | .65 | .65 | .70 | 1.85 | 1.90 | 1.95 | 2.00 | 2.05 | 2.10 | 2.15 | 2.20 | Franklinville | |
| | Bedford | .65 | .65 | .65 | .65 | .65 | .65 | .65 | .70 | 1.90 | 1.95 | 2.00 | 2.05 | 2.10 | 2.15 | 2.20 | 2.25 | Mattituck | d² |
| | E. New York | .60 | .65 | .65 | .65 | .65 | .65 | .65 | .70 | 1.95 | 2.00 | 2.05 | 2.10 | 2.15 | 2.20 | 2.25 | 2.30 | Cutchogue | |
| g² 1 | Cypress Ave. | .55 | .60 | .60 | .65 | .65 | .65 | .65 | .70 | 2.00 | 2.05 | 2.10 | 2.15 | 2.20 | 2.25 | 2.30 | 2.35 | Peconic | g² |
| | U. Course | .50 | .55 | .60 | .65 | .65 | .65 | .65 | .70 | 2.05 | 2.10 | 2.15 | 2.20 | 2.25 | 2.30 | 2.35 | 2.40 | Southold | |
| 6 d² | Woodhaven | .50 | .55 | .60 | .65 | .65 | .65 | .65 | .70 | 2.10 | 2.15 | 2.20 | 2.25 | 2.30 | 2.35 | 2.40 | 2.45 | Greenport | |
| | Morris Park | .50 | .55 | .60 | .65 | .65 | .65 | .65 | .70 | 2.15 | 2.20 | 2.25 | 2.30 | 2.35 | 2.40 | 2.45 | 2.50 | Locust Ave. | d² |
| | Bushwick | .65 | .65 | .65 | .65 | .65 | .65 | .65 | .70 | 2.20 | 2.25 | 2.30 | 2.35 | 2.40 | 2.45 | 2.50 | 2.55 | Springfield | |
| | E. Williston | | .15 | .20 | .25 | .25 | .25 | .35 | .40 | 2.25 | 2.30 | 2.35 | 2.40 | 2.45 | 2.50 | 2.55 | 2.60 | Speonk | |
| d² | Albertsons | .15 | | .15 | .25 | .25 | .20 | .30 | .35 | 2.30 | 2.35 | 2.40 | 2.45 | 2.50 | 2.55 | 2.60 | 2.65 | W. Hampton | d² |
| | Roslyn | .20 | .15 | | .20 | .25 | .25 | .30 | .35 | 2.35 | 2.40 | 2.45 | 2.50 | 2.55 | 2.60 | 2.65 | 2.70 | Quogue | |
| g² 2 | Greenvale | .25 | .25 | .20 | | .15 | .15 | .20 | .25 | 2.40 | 2.45 | 2.50 | 2.55 | 2.60 | 2.65 | 2.70 | 2.75 | Good Ground | g² |
| | Glen Head | .25 | .25 | .25 | .15 | | .15 | .20 | .25 | 2.45 | 2.50 | 2.55 | 2.60 | 2.65 | 2.70 | 2.75 | 2.80 | S. Hampton | |
| d² | Sea Cliff | .25 | .25 | .25 | .15 | .15 | | .20 | .25 | 2.50 | 2.55 | 2.60 | 2.65 | 2.70 | 2.75 | 2.80 | 2.85 | W. Mills | |
| | Glen Cove | .35 | .30 | .30 | .20 | .20 | .20 | | .20 | 2.55 | 2.60 | 2.65 | 2.70 | 2.75 | 2.80 | 2.85 | 2.90 | B. Hampton | d² |
| | Locust Vall'y | .40 | .35 | .35 | .25 | .25 | .25 | .20 | | 2.60 | 2.65 | 2.70 | 2.75 | 2.80 | 2.85 | 2.90 | 2.95 | Sag Harbor | |

Fig. 2

WITNESSES:
Walter W. Lovegrove
Charles S. Bucknall

INVENTOR:
Samuel F. Stevens
By W. E. Hagan
Attorney (No Model.)　　　　　　　　　　　　　　　　5 Sheets—Sheet 3.
S. F. STEVENS.
RAILROAD FARE BOOK.

No. 448,688.　　　　　　　　　　　Patented Mar. 24, 1891.

| 5 | a² | | | | F. Avenue Stations of | | | | Cypress Ave. Last bro⁴ for⁴ | | | | | | | a² | 5 |
|---|---|---|---|---|---|---|---|---|---|---|---|---|---|---|---|---|---|
| Index to C | Boston Somerville To | Boston | Charlestⁿ | U. Square | Somerville | F. Avenue | Bedford | E. New Yk | Cypress Av | Cypress Av | E. New Yk | Bedford | F. Avenue | Somerville | U. Square | Charlestⁿ | Boston | Boston Somerville To | |
| Page | C | C | C | C | C | C | C | C | C | D | D | D | D | D | D | D | D | |
| d² | Boston | | .15 | .17 | .17 | 3.20 | 3.10 | 3.18 | 3.14 | 3.15 | 3.20 | 3.24 | 3.34 | .15 | .18 | .18 | .18 | Brick Yards | d² |
| 5 | Charlestown | .15 | | .15 | .17 | 3.30 | 3.15 | 3.19 | 3.19 | 3.20 | 3.30 | 3.18 | 3.37 | .18 | .19 | .19 | .19 | Fresh Pond | |
| | U. Square | .17 | .15 | | .15 | 3.34 | 3.23 | 3.20 | 3.18 | 3.30 | 3.40 | 3.27 | 3.44 | .19 | .20 | .20 | .20 | Mt Auburn | |
| | Somerville | .17 | .17 | .15 | | 3.40 | 3.14 | 3.22 | 3.22 | 3.40 | 3.50 | 3.32 | 3.60 | .20 | .22 | .22 | .22 | E. Watertown | |
| d² | U. Market | .22 | .22 | .22 | .20 | 3.45 | 3.30 | 3.24 | 3.30 | 3.50 | 3.60 | 3.40 | 3.68 | .25 | .27 | .27 | .27 | B. Brook | d² |
| 6 | Watertown | .22 | .22 | .22 | .20 | 3.50 | 3.40 | 3.30 | 3.40 | 3.55 | 3.55 | 3.45 | 3.70 | .25 | .27 | .27 | .27 | Waltham | |
| | B. Station | .24 | .24 | .24 | .22 | 3.55 | 3.45 | 3.40 | 3.50 | 3.57 | 3.60 | 3.50 | 3.75 | .28 | .30 | .30 | .30 | Roberts | |
| | Bleachery | .25 | .25 | .25 | .24 | 3.60 | 3.65 | 3.45 | 3.47 | 3.60 | 3.65 | 3.70 | 3.80 | .35 | .37 | .37 | .37 | Weston | |

Fig. 3

WITNESSES.　　　　　　　　　　　　　　　　INVENTOR.
Walter W. Lovegrove　　　　　　　　　　　Samuel F. Stevens
Charles S. Buntrall　　　　　　　　　　　by W. E. Hagan
　　　　　　　　　　　　　　　　　　　　　　ATTORNEY.

(No Model.)

5 Sheets—Sheet 4.

S. F. STEVENS.
RAILROAD FARE BOOK.

No. 448,688. Patented Mar. 24, 1891.

| 6 | $a^2$ | | | | | U. Course Stations of | | | Bushwick list brought for'd | | | | | | | | $a^2$ | 6 |
|---|---|---|---|---|---|---|---|---|---|---|---|---|---|---|---|---|---|---|
| Index to C | U. Market Bleachery To | U. Market | Watertown | B. Station | Bleachery | U. Course | Woodhaven | Morris Pk. | Bushwick | Bushwick | Morris Pk. | Woodhaven | U. Course | Bleachery | B. Station | Watertown | U. Market | U. Market Bleachery To | |
| Page | C | C | C | C | C | C | C | C | D | D | D | D | D | D | D | D | D | | |
| $d^2$ | Boston | .22 | .22 | .20 | .25 | 3.00 | 3.04 | 3.07 | 3.10 | 2.95 | 3.00 | 3.04 | 3.00 | .22 | .20 | .18 | .18 | Brick Yard | $d^2$ |
| 5 | Charlestown | .22 | .22 | .24 | .25 | 3.10 | 3.10 | 3.15 | 3.20 | 3.00 | 3.04 | 3.07 | 3.04 | .22 | .20 | .18 | .18 | Fresh Pond | |
| | U. Square | .22 | .22 | .24 | .25 | 3.12 | 3.17 | 3.20 | 3.22 | 3.15 | 3.07 | 3.09 | 3.08 | .20 | .18 | .15 | .15 | McAuburn | |
| | Somerville | .20 | .20 | .22 | .24 | 3.14 | 3.20 | 3.25 | 3.22 | 3.17 | 3.10 | 3.14 | 3.12 | .20 | .18 | .15 | .15 | E. Watertown | $g^2$ |
| $d^2$ | U. Market | | .15 | .17 | .19 | 3.16 | 3.25 | 3.30 | 3.32 | 3.20 | 3.15 | 3.17 | 3.15 | .15 | .16 | .17 | .17 | B. Brook | |
| 6 | Watertown | .15 | | .15 | .18 | 3.18 | 3.30 | 3.32 | 3.35 | 3.25 | 3.12 | 3.20 | 3.17 | .15 | .18 | .20 | .20 | Waltham | |
| | B. Station | .17 | .15 | | .15 | 3.25 | 3.35 | 3.40 | 3.42 | 3.30 | 3.18 | 3.20 | 3.20 | .20 | .23 | .21 | .22 | Roberts | $d^2$ |
| | Bleachery | .19 | .18 | .15 | | 3.30 | 3.40 | 3.45 | 3.47 | 3.27 | 3.24 | 3.27 | 3.25 | .25 | .28 | .23 | .24 | Weston | |
| $b^2$ | | | | $h^2$ | | | | | | | | | | $h^2$ | | | | | |

Fig. 4

WITNESSES.
*Walter N. Lovegrove*
*Charles S. Buntwall*

INVENTOR.
*Samuel F. Stevens*
by *W. E. Hagan*
ATTORNEY.

(No Model.)　　　　　　　　　　　　　　　　　5 Sheets—Sheet 5.

S. F. STEVENS.
RAILROAD FARE BOOK.

No. 448,688.　　　　　　　　　　　　　　Patented Mar. 24, 1891.

| Index to C | A Page | $a^2$ A | $a^2$ B | | Index to C | Page | $a^2$ C | $a^2$ D | |
|---|---|---|---|---|---|---|---|---|---|
| | | F. Avenue | Franklinville | | | | Boston | Brick Yards | |
| | $d^2$ | Bedford | Mattituck | | | | Charlestown | Fresh Pond | $d^2$ |
| | | E. New York | Cutchogue | | | 5 | U. Square | Mt. Auburn | |
| $g^2$ | 1 | Cypress Ave | Peconic | | | | Somerville | E. Watertown | $g^2$ |
| | | U. Course | Southold | | | | U. Market | B. Brook | |
| | | Woodhaven | Greenport | | | 6 | Watertown | Waltham | $d^2$ |
| 6 | $d^2$ | Morris Park | Locust Ave | | | | B. Station | Roberts | |
| | | Bushwick | Springfield | | | | Bleachery | Weston | |
| | | E. Williston | Speonk | | | | | | |
| | | Albertsons | W. Hampton | | | | | | |
| | $d^2$ | Roslyn | Quogue | | | | | | |
| $g^2$ | 2 | Greenvale | Good Ground | | | | | | |
| | | Glen Head | S. Hampton | | | | | | |
| | $d^2$ | Sea Cliff | W. Mills | | | | | | |
| | | Glen Cove | B. Hampton | | | | | | |
| | | Locust Vall. | Sag Harbor | | | | | | |
| | $b^2$ | | | | | | | | |

*Fig. 5*

WITNESSES.　　　　　　　　　　　　　　　　INVENTOR.
Walter N. Lovegrove　　　　　　　　　　　Samuel F. Stevens
Charles S. Burntrall　　　　　　　　　　　By W. E. Hagan
　　　　　　　　　　　　　　　　　　　　　　　ATTORNEY.

UNITED STATES PATENT OFFICE.

SAMUEL FREDERICK STEVENS, OF NORTH ADAMS, MASSACHUSETTS.

RAILROAD FARE-BOOK.

SPECIFICATION forming part of Letters Patent No. 448,688, dated March 24, 1891.

Application filed November 8, 1887. Serial No. 254,653. (No model.)

*To all whom it may concern:*

Be it known that I, SAMUEL FREDERICK STEVENS, of North Adams, county of Berkshire, and State of Massachusetts, have invented new and useful Improvements in Railroad Fare-Books, of which the following is a specification.

My invention relates to an improvement in railroad fare-books wherein is arranged in a novel manner the matter indicating railroad-fares, as between stations, for the use of train-conductors and others, my invention having for its object conciseness of arrangement and convenience of form for quick and easy reference.

My invention consists, as will be more fully detailed hereinafter in connection with its illustration, in the arrangement of matter upon an index-page of a fare-book in such a manner that there shall be two or more columns of railroad-station names, which station-names are divided off into groups by horizontal lines or brackets, each of which columns of station-names is designated as an A, B, C, or D list or by numbers, with columns ruled off at the side of said designated station-columns, giving by numbers the pages of the book where fares relating to said station-names are found, each of the pages of the book other than the index-page consisting of the facing surface of the two leaves of the book numbered as one page, with each of the leaves of each of such pages having printed upon the outer edge of each leaf thereof a column of station-names grouped, as shown in the index-page, with said columns of station-names listed by the same letter or number as in the index-page to designate the same stations on all pages of the book, and figures arranged at each side of said groups of stations indicating at what page of the book the fares between such listed stations and other stations of the same list or other lists may be found, and fare-columns arranged upon the inside of each of the listed columns having the station-names of the first group of stations repeated at the fare-columns of the first list on the left-hand leaf of the book, and the station-names of the lower group of the first list repeated at the top of the fare-columns of the second list upon the right-hand leaf of the book.

Accompanying this specification to form a part of it there are five plates of drawings containing five figures illustrating my invention, with the same designation of tabulated matter by letter reference used in all of the figures.

Of these illustrations, Figure 1 shows the book open at page 1. Fig. 2 shows the book open at page 2. Fig. 3 shows the book illustrated as open at page 5. Fig. 4 shows the book as open at page 6, and Fig. 5 shows the book open at the index-page.

The letters $a^2$ indicate upon the index-page as well as all the other pages of my fare-book columns of station-names, designated as A, B, C, and D lists, although other letters or even numbers may be used instead of letters to so designate them. Each of these lists of station-names is divided off horizontally into full groups $g^2$ of preferably eight station-names, and each of these full groups of station-names is horizontally divided off into sub-groups $d^2$, having about half the number of station-names of the full groups.

Upon the left-hand edge of the index-page and at the left-hand side of each of these columns of A, B, C, and D lists of stations there are figures in column designated at $b^2$, indicating the pages of the book whereat may be found the pages of the book that give the fares between each of the stations of said groups in the same column where they are listed, as well as figures giving pages of the book designating fares between the stations of said groups and groups of stations in other and differently-listed columns.

In using the index-page of the book, to find the fare, for instance, between "Fifth Avenue" of the A list and "Boston" of the C list, the figure "5" is found opposite the sub-group in the $b^2$ column in which the station "Fifth Avenue" occurs, which figure indicates the page where the fares relating to Fifth Avenue are found.

To find the fares between any of the stations of the upper group of the A list, figure "1," designates the page at which such fares may be found, and the figure "2" indicates the page at which the fares between each of the stations of the second full group in the A list may be found.

Each two of the facing leaves of the book other than the index-page constitute a page of the book and are so numbered, and upon each of the two facing leaves of each page of the book there is arranged a listed column of station-names that are each grouped and designated by a listing-letter, as in the index-page, the same listing-letter applying to the same stations in all the station-names in column on all of the pages.

Upon the inside edge of each leaf of the page other than the index-page and inside of each of the station-names column where listed are fare-columns ruled off vertically and designated at $h^2$, and at the top of each of said fare-columns the name of one of the stations of the upper group of the left-hand list is placed and relatively in the same order that they are arranged in the listed columns, and upon the right-hand leaf of the book where open is placed at the head of the fare-columns the lower group of the left-hand column of stations in their order, as shown at Figs. 1 and 2, with the fare from each of the column-lists stations to the station at the head of the fare-column longitudinally opposite thereto, there being two differently-listed columns of stations upon each page.

Upon the outside left-hand edge of all the pages of the book and upon the left-hand leaf thereof there are also placed in column, as indicated at $b^2$, index-figures indicating, in connection with the list-letter at the top of said page-column $b^2$, the page at which the fares from stations in the listed column to those in that list of stations designated by the list-letter at the top of the said page-column may be found.

The matter thus tabulated and arranged is used as follows:

To find the fare from any station of the A list upper group to any station of the A list, on referring to the index-page it is found that page 1 is designated as the page of the book showing such fares. Thus, to find the fare between "Fifth Avenue" of said A list to "Morris Park," same list, on opening the book at page 1 the fare-column having the station-name "Morris Park" at its top being followed down to where opposite to "Fifth Avenue" horizontally the fare, "35 cents," is found.

To find the fare between "Bedford" of the upper group of the A list to "Sea Cliff" of the lower group of the A list, the figure "2" in the $b^2$ column of the index-page indicates the book-page, and on opening the book at page 2 and following down to the "Sea Cliff" column of fares to horizontally opposite "Bedford," the fare, "65 cents," is found.

To find the fare between stations of the A list and stations of the B list, referring to the index-page to get the book-page and opening the book at the page so designated, said fares are found in the same manner as before. While the index-page numbers are repeated in all the page-columns for convenience, they may be omitted and only those upon the index-page used, if desired.

After a series of station-names have been thus listed and the fares so tabulated and arranged, and it is desired to add additional lists, they may be put in succeeding pages of the book and the preceding list in their order brought forward, as at figures 5 and 6, Fig. 4, where the A list is in part brought forward, and when this is done an additional page-column is added to the index-page, with a list-designating letter at the top of the page-column so added, with the number of the page at which it is found placed in said added page-column, as before, and the added tabulated matter is used in the same manner as the other herein described.

There are many advantages arising from the method of tabulating the matter herein shown and described, arising from the facility at which fares between stations can be quickly found by its use, while it increases somewhat the thickness of the book, yet it reduces the length and width of the pages, so that the book may be easily carried in the pocket.

Having thus described my invention, what I claim, and desire to secure by Letters Patent, is—

In a railroad fare-book, an index-page whereon are designated and listed the names of stations arranged in groups comprising a number of the stations and having page-indicating numerals arranged opposite each group, and provided with additional pages having arranged upon each of the facing surfaces of two leaves a column of names of stations, with fare-columns arranged upon the face of each page adjacent to the said station-column, with one of the groups of stations on the left-hand page of the book arranged in its order at the head of the fare-column of said left-hand list and the other group of said left-hand-page column of station-names arranged in reversed order at the tops of the fare-columns of the station-list upon the right-hand leaf of the book, substantially as and for the purpose specified.

Signed at Troy, New York, this 1st day of October, 1887, and in the presence of the two witnesses whose names are hereto written.

SAMUEL FREDERICK STEVENS.

Witnesses:
   CHARLES S. BRINTNALL,
   W. E. HAGAN.